United States Patent Office 3,459,808
Patented Aug. 5, 1969

3,459,808
PROCESS FOR THE PREPARATION OF PHOS-
PHONIUM SALTS AND PHOSPHINE OXIDES
STARTING WITH ALUMINUM TRIALKYL
Robert E. Hall, Wyoming, Adriaan Kessler, Cincinnati, and Aubrey R. McLain, Wyoming, Ohio, assignors to The Procter & Gamble Company, Cincinnati, Ohio, a corporation of Ohio
No Drawing. Filed June 24, 1966, Ser. No. 560,108
Int. Cl. C07f 9/54, 9/52, 9/50
U.S. Cl. 260—606.5          11 Claims

ABSTRACT OF THE DISCLOSURE

A novel process for preparing quaternary phosphonium salts, precursors for tertiary phosphine oxide detergents, comprising the steps of forming alkyldichlorophosphine from aluminum trialkyl and phosphorous trichloride, hydrogenating the alkyldichlorophosphine to form alkylphosphine, and methylating the alkylphosphine to obtain a quaternary alkyltrimethyl phosphonium salt.

This invention relates to a process for the preparation of phosphonium salts and phosphine oxides. More specifically, a novel multi-step process for the preparation of quaternary phosphonium salts which are direct precursors of detergent tertiary phosphine oxides has been discovered starting with the reacting of aluminum trialkyl and phosphorous trichloride. A beneficial and characterizing feature of this process, in addition to the fact that it utilizes aluminum trialkyls as a starting material, is that it is free from the use of phosphine, a toxic gas which is a necessary intermediate in several previously known methods of preparing phosphine oxides.

Certain tertiary phosphine oxides and their use as detergent substances are described in Belgian Patent 615,204. Production of these compounds in an efficient and convenient manner is desirable.

In an article by K. Darrell Berlin and George B. Butler entitled "The Preparation and Properties of Tertiary and Secondary Phosphine Oxides" [Chemical Reviews 60, 3243 (June 1960)], several preparative techniques for tertiary phosphine oxides are disclosed. Also, G. M. Kosolapoff in Organophosphorous Compounds (1950), presents a comprehensive review of techniques employed for the preparation of various phosphine oxides. However, most of these techniques have proved to be uneconomical and/or undesirable for the efficient and convenient production of detergent-type phosphine oxides.

A particular difficulty which has been encountered in the preparation of phosphine oxides or their precursors has been the fact that previously known preparative techniques generally involve the use of phosphine gas. The use of phosphine is undesirable because of the toxic and highly flammable nature of this gas, especially in light of the fact that reactions involving phosphine, e.g., the reaction of phosphine with an olefin, generally involve extremely high pressures and/or temperatures. Therefore, a process for preparing detergent-type phosphine oxides wherein the use of phosphine is avoided is highly desirable.

A further difficulty in previously known methods for preparing detergent-type phosphine oxides or their precursors relates to the fact that only certain limited materials have been satisfactory hydrophobic group sources, e.g., long chain olefins. Therefore, a process for preparing detergent-type phosphine oxides on their precursors utilizing a different, economical, and readily available material, e.g., an aluminum trialkyl, as the source of the hydrophobic group is highly desirable.

Accordingly, it is an object of this invention to provide a novel process for the production of quaternary phosphonium salts which are direct precursors of detergent tertiary phosphine oxides.

It is a further object of this invention to provide a novel process for the preparation of detergent phosphine oxides, said process being free from the use of phosphine.

It is a more particular object of this invention to provide a novel process for the production of alkyldimethylphosphine oxides, said process starting with the reaction of aluminum trialkyl and phosphorous trichloride.

These and other objects are achieved by a process for the production of quaternary phosphonium salts, which comprises:

(a) reacting aluminum trialkyl and phosphorous trichloride to form alkyldichlorophosphine;
(b) hydrogenating the alkyldichlorophosphine at a mole ratio of hydrogen to alkyldichlorophosphine ranging from about 3:1 to about 15:1 to form alkylphosphine;
(c) methylating the alkylphosphine to form a quaternary alkyltrimethylphosphonium salt.

The alkyl quaternary alkyltrimethylphosphonium salt can readily be converted to a detergent tertiary phosphine oxide by an additional and optional step, which comprises: cleaving the quaternary alkyltrimethylphosphonium salt with a base to form alkyldimethylphosphine oxide.

The process of this invention will be described in detail hereinafter.

Part (a)

The first step in the above-described process involves the reaction of aluminum trialkyl and phosphorous trichloride to form alkyldichlorophosphine

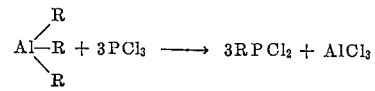

(R is an alkyl radical of 7–25 carbons).

The starting aluminum trialkyls used in the process of this invention can be derived from any suitable source. One of the particular advantages of the process of this invention is the fact that aluminum trialkyls are readily and economically available. Aluminum trialkyls containing from about 7 to about 25 carbons, preferably from about 12 to about 18 carbons, per alkyl are preferred; thus, the final phosphine oxide products possess highly useful detergent properties.

The above-mentioned higher aluminum trialkyls can be prepared by growing ethylene onto lower aluminum trialkyls or aluminum alkyl hydrides in a manner represented by the reaction wherein ethylene is grown onto aluminum tripropyl. This method is often referred to as the "ethylene build-up" process and is illustrated below:

$$\text{Al} \begin{matrix} (CH_2)_2{-}CH_3 \\ (CH_2)_2{-}CH_3 \\ (CH_2)_2{-}CH_3 \end{matrix} + n\ CH_2{=}CH_2 \longrightarrow$$

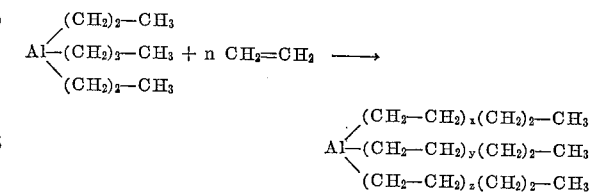

($x$, $y$ and $z$ represents integers ranging from 2–11 and $n$ is an integer greater than 3).

Instead of aluminum tripropyl in the above ethylene build-up reaction, other low molecular weight aluminum alkyls which can be used include, for example, aluminum triethyl, aluminum tributyl, aluminum diethyl hydride and aluminum ethyldihydride. The above method of preparing higher aluminum trialkyls is described in German Patent No. 917,006, and in U.S. Patent No. 2,827,458.

Higher aluminum trialkyls can also be prepared by a displacement reaction wherein an unsaturated alkyl compound (olefin) is reacted with a low molecular weight aluminum trialkyl, such as aluminum tri-isobutyl, according to the following equation:

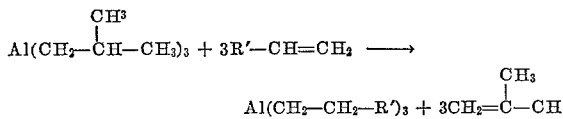

(R' is an alkyl radical of 5–23 carbons).

Suitable unsaturated alkyl compounds for use in the above-illustrated reaction include, for example, 1-octene, 1-nonene, 1-decene, 1-undecene, 1-dodecene, 1-tetradecene, 1-pentadecene, 1-hexadecene, 1-heptadecene and 1-octadecene. It is essential to have the double bond in the 1-position.

It is to be recognized that the aluminum trialkyl compounds useful herein can contain individual alkyl groups of varying chain length. When such compounds are used, the alkyldichlorophosphine intermediate product and the ultimate alkyldimethylphosphine oxide product are correspondingly comprised of mixed chain length molecules, e.g., for the first step of the process:

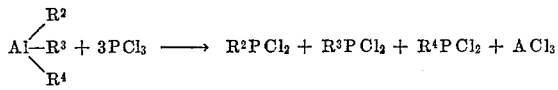

($R^2$, $R^3$, and $R^4$ are each alkyl radicals of 7–25 carbons).

This is not undesirable, however, as a detergent phosphine oxide of varying chain length is a highly useful product.

The aluminum trialkyl compounds which can be used in the first step of the process of this invention can contain branched or normal alkyl radicals. It is preferred, however, to employ aluminum compounds containing the straight chain or normal alkyl substituents. Accordingly, the employment of straight chain aluminum trialkyl compounds will, when carrying out the instant process, result in a production of straight chain alkyldimethylphosphine oxides. Examples of aluminum trialkyls which can be used in the process of this invention are aluminum trioctyl, aluminum trinonyl, aluminum tridodecyl, aluminum triundecyl, aluminum tritetradecyl and aluminum tri n-decyl (hereinafter aluminum tridecyl). Some examples of aluminum trialkyls having varying individual alkyl chain lengths which can be employed are aluminum dioctyl monoisononyl, aluminum ditetradecyl monohexadecyl, aluminum di(isododecyl) monohexadecyl, aluminum di(isotetradecyl) monohexadecyl, aluminum dihexadecyl monooctyl, aluminum di(isohexadecyl) monododecyl, aluminum ditetradecyl monododecyl and the like. Mixtures of these aluminum alkyls can also be satisfactorily used. A highly preferred aluminum trialkyl starting compound for use in this invention is selected from the group consisting of aluminum tridecyl and aluminum tridodecyl.

The phosphorous trichloride reactant can generally be prepared by passing a current of dry chlorine over gently heated phosphorus which ignites. The phosphorous trichloride thus formed can then be purified by distillation. Phosphorous trichloride, as a liquid, is also available commerically in cylinders or tank cars. For further details on the method of preparing phosphorous trichloride, or its availability, see The Condensed Chemical Dictionary, sixth edition, p. 891.

The phosphorous trichloride should be used in a high molar excess in relation to the aluminum trialkyl in order to maximize the conversion to the desired alkyldichlorophosphine product. Lower molar ratios of phosphorous trichloride to aluminum alkyl, e.g., a 3:1 or stoichiometric ratio, can result in the formation of undesirable products such as dialkylmonochlorophosphine and trialkylphosphine.

A further reason for the use of a molar excess of phosphorous trichloride is to provide a convenient reaction medium. More specifically, it is preferred that the molar ratio of phosphorous trichloride to aluminum trialkyl range from about 3.5:1 to about 20:1, most preferably, from about 5:1 to about 12:1.

The reaction can be carried out over a wide temperature range with satisfactory results. However, a temperature ranging from about 70° C. to about 180° F. is preferred. Temperatures ranging from about 90° F. to about 150° F. are especially desirable.

The reaction is exothermic and temperature control can be effected by withdrawing the heat of reaction at a rate sufficient to maintain the desired reaction temperature. Heat withdrawal from the reaction can be effected by conventional means such as various external heat exchange arrangements, e.g., a cooling coil; by refluxing a relatively volatile inert solvent from the reaction mixture under desired pressure, condensing the vapors and returning them to the reaction zone; or by the use of relatively large volumes of inert solvents or diluents having a suitably high heat capacity, e.g., saturated hydrocarbons.

The reaction can be effected at atmospheric pressure or superatmospheric pressures. Ordinarily the reactions in question do not proceed with substantial pressure change, so that the selection of the desired pressure is based principally upon physical considerations involved in the reaction, e.g., the boiling point of the reaction mixture.

Since the reactants and the products react readily with oxygen in the atmosphere, it is desirable to effect reaction to the exclusion of air and also to the exclusion of impurities such as sulfur compounds or acetylene. The reaction can be effected under an atmosphere of helium, nitrogen or other inert gas; alternatively, a blanket of inert hydrocarbon gas, for example, ethane or propane, can be supplied over the surface of the reaction mixture to prevent access of atmospheric oxygen to the reactants.

Aluminum chloride is a by-product in the above-described reaction, one mole being formed for every three moles of the alkyldichlorophosphine product. The alkyldichlorophosphine and the aluminum chloride tend to combine together in the reaction mixture to form a complex:

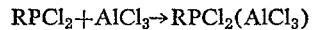

Before proceeding with the subsequent steps of the process, this complex is preferably dissociated, i.e., the alkyldichlorophosphine is freed and separated from the complex so that it can be hydrogenated in the subsequent step. It has been discovered that this separation can be accomplished by the following sequential procedure:

(1) distilling the reaction mixture in a vacuum to remove excess phosphorous trichloride; then
(2) adding a complexing agent which preferentially forms a complex with the aluminum chloride thus freeing the alkyldichlorophosphine; and
(3) extracting the free alkyldichlorophosphine from the reaction mixture.

The vacuum distilling can conveniently be carried out at a pressure ranging from about 5 mm. to about 100 mm. and at a temperature of from about 50° F. to about 100 F.

Suitable complexing agents which can be used to preferentially complex with the aluminum chloride thus freeing the alkyldichlorophosphine are: phosphorous oxychloride; water; alkyl metal halides such as potassium chloride and sodium chloride; and bis-dichloroethylether. Phosphorous oxychloride is the preferred complexing agent. Preferably, the complexing agent is added in an amount from about 1 part to about 100 parts, preferably about 50 parts, based on the amount of aluminum chloride present in the reaction mixture. Preferably, after addition of the complexing agent and before extraction of freed alkyldichlorophosphine, the reaction mixture is agitated for a period of time at an elevated temperature, e.g., for from about 10 minutes to about 4 hours at from about 100° F. to about 160° F., most preferably for about 2 hours at about 120° F. This insures complete reaction between the complexing agent and the aluminum chloride.

Suitable solvents for extracting the freed alkyldichlorophosphine are ethers, e.g., petroleum ether (ligroin), diethyl ether, and the like, preferably petroleum ether. The abovedescribed complexes exist essentially as precipitates in the reaction mixture. However, there is a slight solubility and thus extraction techniques rather than, e.g., filtration, are preferably used to separate excess solvent and the alkyldichlorophosphine product.

Part (b)

This step of the process involves hydrogenating the alkyldichlorophosphine obtained in the previous step to form alkylphosphine:

$$RPCl_2 + 2H_2 \rightarrow RPH_2 + 2HCl$$

Preferably, the alkyldichlorophosphine which has been extracted from the reaction mixture of part (a) is purified by vacuum distillation before proceeding with the hydrogenation step.

The hydrogenation can be carried out in a suitable apparatus, e.g., an autoclave, preferably at an elevated temperature and pressure in the presence of a suitable catalyst. Preferably, the pressure ranges from about 100 p.s.i. to about 2000 p.s.i., most preferably, from about 800 p.s.i. to about 1200 p.s.i., and the temperature ranges from about 80° F. to about 500° F., most preferably, from about 200° F. to about 400° F. The time of hydrogenation varies with the temperature, pressure and concentration of reactants but it is generally desirable to carry out this reaction for a time ranging from about 10 minutes to about 4 hours, most preferably, from about 20 minutes to about 2 hours.

It has been discovered that the mole ratio of hydrogen to alkyldichlorophosphine is critical for the formation of the desired alkylphosphine product. More particularly, a mole ratio of hydrogen to alkyldichlorophosphine ranging from about 3:1 to about 15:1, most preferably, from about 4:1 to about 10:1 is required for this reaction. Higher molar ratios than that specified are not practical on the basis of obtaining product in an economical and efficient manner; lower molar ratios than that specified result in the formation of undesirable side products believed to be cyclic phosphorus compounds.

Suitable catalysts for the hydrogenation reaction are palladium, copper, nickel and platinum, most preferably palladium.

It is convenient and desirable to utilize a suitable inert carrier, e.g., charcoal, in conjunction with the catalyst.

The amount of catalyst used can range from about 1% to about 50%, most preferably from about 5% to about 15%, based on the amount of alkyldichlorophosphine.

Hydrochloric acid is formed as a by-product of the hydrogenation reaction. Therefore, an alkaline material is preferably added to the reaction mixture before the hydrogenation to neutralize the hydrochloric acid in situ as it is formed. Suitable alkaline materials are any of the common bases, e.g., ammonia, sodium hyroxide, potassium hydroxide and, preferably triethylamine. The base is preferably added in amounts ranging from about 20% to about 200%, preferably about 80%, based on the amount of alkylchlorophosphine.

The alkylphosphine product can be separated from the reaction mixture by diluting with chloroform and extracting with petroleum ether. Preferably, this separation is effected before proceeding with the subsequent step.

Part (c)

The methylation step of the process whereby the alkyl-phosphine prepared in the previous hydrogenation step is converted into a quaternary alkyltrimethylphosphonium salt proceeds in the general manner outlined as follows:

$$RPH_2 + CH_3Cl/CH_3OH \longrightarrow R\overset{+}{P}(CH_3)_3Cl + H_2O + HCl$$

This general type of methylation reaction is known in the art. See Jerchel, Dietrich, Berichte der Deutschen Chemischen Gesellschaft, 76A, 600–609 (1943). Surprisingly, however, it has been discovered that particularly advantageous results are realized when the methylating agent is a certain mixture of methyl chloride and methanol instead of the methyl chloride per se as is suggested in the art. More specifically, a methyl chloride-methanol mixture comprising from about 5 parts to about 2 parts methyl chloride and from about 1 part to about 3 parts methanol is preferred for use as the methylating reagent in this reaction. A mixture comprising about 1 part methyl chloride and about 2 parts methanol is especially preferred.

Use of the above-described methyl chloride-methanol mixture for the methylation reaction results in an equivalent yield of quaternary alkyltrimethylphosphonium salt as compared to methylation with pure methyl chloride but use of said mixture is advantageous for two reasons. First, it is more economical because methanol is a less expensive reagent than methyl chloride; and second, hydrochloric acid is effectively neutralized by the methyl chloride-methanol mixture. Hydrochloric acid is a by-product of the methylation reaction and is, of course, desirably neutralized because of its tendency to corrode process equipment and the like. Mechanistically, it is believed that the hydrochloric acid is neutralized by reacting with the methanol to form additional methyl chloride:

$$CH_3OH + HCl \rightarrow CH_3Cl + H_2O$$

Thus, the use of a methyl chloride-methanol mixture as a reagent for the methylation of alkylphosphine is preferred for use herein because use of said mixture enables this reaction to be carried out in an economical and convenient manner.

Preferably, the methylation reaction is carried out by adding the alkylphosphine to the methyl chloride-methanol mixture in a weight ratio of alkylphosphine to the methyl chloride-methanol ranging from about 0.2:1 to about 1.5:1, more preferably, from about 0.8:1 to about 1.1:1, then stirring or shaking the reaction mixture at a temperature ranging from about 200° F. to about 600° F., most preferably from about 450° F. to about 500° F., and at a pressure ranging from about 10 p.s.i. to about 2000 p.s.i., most preferably at about 1500 p.s.i., for a period of time ranging from about 1 minute to about 3 hours, most preferably from about 3 minutes to about 10 minutes.

The alkyltrimethylphosphonium salt can be separated from the reaction mixture by vacuum distillation. Preferably, this separation is effected before proceeding with the subsequent step. This salt is useful per se as a surface active agent. See U.S. Patent 2,302,697, issued to Morris Katzman on Nov. 24, 1942, and the above-cited Jerchel reference. Its principal utility, however, is in the preparation of detergent phosphine oxides.

The additional or optional step of the process, i.e., the production of a detergent tertiary phosphine oxide by cleavage of the quaternary alkyltrimethylphosphonium salt formed in the preceding methylation step, proceeds in the manner outlined below:

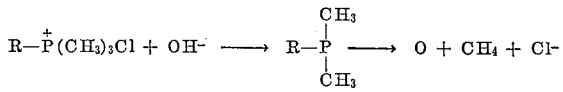

alkyldimethylphosphine oxide

The above-illustrated cleavage reaction is disclosed in detail in the copending application of Hugh R. Hays, Ser. No. 329,251, filed Dec. 9, 1963.

The base used in the above cleavage reaction can be selected from a wide variety of bases. It need only be a rather strong base which can furnish a hydroxyl (OH⁻) ion. Therefore, oxides, hydroxides and $C_1$–$C_4$ alkoxides of alkali metals and alkaline earths, e.g., potassium hydroxide, calcium hydroxide, sodium ethoxide, sodium methoxide, barium hydroxide, potassium t-butoxide and potassium ethoxide, can all be used. Specific bases which have proved to be especially desirable for use in the reaction are sodium hydroxide, potassium methoxide and calcium hydroxide. When oxides and alkoxides are used at least one equivalent weight of water must be present to produce the OH⁻ ion necessary for the reaction. Sodium hydroxide is preferred as a basic reactant because of its wide availability in many physical forms (e.g., pellets, granules) and relatively low cost. Powdered anhydrous base is the preferred form for the basic reactant in that this reaction proceeds at low temperatures and with the least difficulty if no water is present. 76% sodium hydroxide is available in a flake form which melts readily on heating and is also suitable for use in this reaction. Sodium hydroxide which contains more than 40% by weight water reacts too slowly and tends to foam undesirably with the phosphine oxide detergent being produced in the reaction.

Although it is preferred that the reaction system be essentially water-free for the cleavage reaction, small amounts of water can be tolerated in this reaction, i.e., not more than about 20% water based on the amount of reaction mixture. Some solvent in small amounts, e.g., up to about 20% based on the amount of reaction mixture, is usually desirable to impart fluidity to the reaction mixture. Such solvents include water and lower monohydric alcohols (e.g., $C_1$ to $C_4$ alcohols). Non-polar organic solvents can also be used if desired but are not necessary.

The temperature of the cleavage reaction should be maintained below about 300° F., preferably from about 120° F. to about 160° F. At temperatures higher than about 300° F., there is some danger that at least a portion of the product may be decomposed (phosphine oxides generally decompose at approximately 300° F.).

A molar excess (e.g., up to about 25%) of base is preferably used to assure complete reaction of the quaternary alkyltrimethylphosphonium salt. The mixture is heated to the appropriate reaction temperature and reaction is carried on until substantially all of the quaternary alkyltrimethylphosphonium reactant has been reacted. The time required for the reaction to be completed is directly related to the temperature at which the reaction is carried out. In a water-free system and at minimum reaction temperatures (set forth above) the reaction requires several minutes, e.g., 20 minutes, whereas at elevated temperatures the reaction can be completed in 1 to 5 minutes. If water is present, the reaction requires higher temperatures and a longer time to go to completion. In any event, methane is evolved as the reaction proceeds; thus evolution of methane serves as a convenient guide to the completeness of the reaction.

The detergent tertiary phosphine oxide product produced by the above-discussed reaction can be readily separated from the reaction mixture, e.g., by conventional distillation, vacuum distillation or steam distillation techniques. Since the phosphine oxide product tends to crystallize on cooling, convenient separation can also be achieved by conventional recrystallization-filtration techniques. Extraction of the phosphine oxide product from the reaction mixture with organic solvents, followed by removal of any solvent present, e.g., by distillation, is another means of separation.

The detergent tertiary phosphine oxide product prepared by the above-described process is, of course, useful per se as a detergent. It is especially useful when combined with other detergent ingredients and builders to form flake, granular and liquid detergent compositions of the type described in Belgian Patent 615,204, granted to Yoke and Laughlin, on Sept. 17, 1962.

The following example illustrates the invention but is not intended to be limiting. All percentages and ratios in the example, and in this specification and the appended claims, are by weight unless specified otherwise.

EXAMPLE

Part (a)

Reaction of aluminum tridecyl and phosphorous trichloride; separation of the decyldichlorophosphine product.—To a one liter flask containing 181.5 ml. of phosphorous trichloride was slowly added 103.9 g. of aluminum tridecyl under a nitrogen atmosphere; the temperature was maintained within the range of 120° F.–145° F. during this addition by means of a copper cooling coil adjacent to the flask. At this point, aluminum chloride was complexed with the decyldichlorophosphine product. Excess phosphorous trichloride was removed from the reaction mixture by vacuum distillation and 53.1 g. of phosphorous oxychloride was then added to preferentially complex with the aluminum chloride thus freeing the decyldichlorophosphine. The reaction mixture was heated to 150° F., allowed to cool to room temperature (70° F.), and excess phosphorous oxychloride was removed by vacuum distillation. Extraction of the reaction mixture with 400 ml. of petroleum ether gave 89.2 g. of decyldichlorophosphine.

Part (b)

Hydrogenation of decyldichlorophosphine to form decylphosphine.—To a 50 ml. high pressure autoclave equipped witth a magnetic agitator was added 6.44 g. of decyldichlorophosphine prepared according to step (a) above, 5.07 g. of triethylamine, and 6.0 g. of charcoal containing 0.62 g. of palladium. The autoclave was then charged with 1000 p.s.i. of hydrogen and maintained at 482° F. for 30 minutes with agitation. Thus, the mole ratio of hydrogen to decyldichlorophosphine was about 4:1. The reaction mixture was removed from the autoclave by dilution with chloroform. Extraction of the chloroform solution with petroleum ether gave 0.7 g. of decylphosphine product.

Part (c)

Methylation of decylphosphine to form a quaternary decyltrimethylphosphonium salt.—To an 8.5 ml. glass ampul equipped with a wrist action shaker and an oil bath heater was added 1.2 g. of decylphosphine prepared according to step (b) above, 0.45 g. of methyl chloride and 0.86 g. of methanol. The ampul was shaken at 500° F. for five minutes at which time infrared analysis of the reaction mixture showed an essentially quantitative conversion to decyltrimethylphosphonium chloride. Purification of this product is accomplished by vacuum distillation, e.g., 5–20 mm. 80° F.

Optional step

Cleavage of quaternary decyltrimethylphosphonium chloride to form decyldimethylphosphine oxide.—A mixture of 28 g. of decyltrimethylphosphonium chloride prepared according to step (c) above, and 4.4 g. of powdered anhydrous sodium hydroxide is heated in a flask to a temperature of about 68° F., at which temperature reaction is observed to occur. The reaction is carried out with agitation until evolution of methane is no longer noted. The desired product, decyldimethylphosphine oxide is isolated by vacuum distillation of the reaction mixture.

In part (a) of the example, substantially equivalent results are obtained in that the aluminum chloride is preferentially complexed thus freeing the decyldichlorophosphine when the phosphorous oxychloride is replaced by a complexing agent selected from the group consisting of water, potassium chloride, sodium chloride, and bis-dichloroethylether.

Also, in part (b) of the example, substantially equivalent results are obtained in that the decyldichlorophosphine is reduced to decylphosphine when the palladium is replaced by a catalyst selected from the group consisting of copper, nickel, and platinum.

In the optional step of the example, substantially equivalent results are observed in that decyldimethylphosphine oxide is formed when the sodium hydroxide is replaced by a base selected from the group consisting of barium hydroxide, potassium hydroxide, calcium hydroxide, and sodium methoxide.

Additionally, in the above example, substantially equivalent results are obtained in each step when the decyl compounds used therein are replaced with corresponding alkyl compounds of from about 7 to about 25 carbon atoms in alkyl chain length, e.g., when the original aluminum tridecyl reactant is replaced by aluminum tridodecyl, the ultimate product is dodecyldimethylphosphine oxide.

What is claimed is:
1. A process for the production of quaternary phosphonium salts, which comprises:
   (a) reacting aluminum trialkyl and phosphorous trichloride to form alkyldichlorophosphine;
   (b) hydrogenating the alkyldichlorophosphine in the presence of a metal catalyst selected from the group consisting of palladium, copper, nickel, and platinum, at a mole ratio of hydrogen to alkyldichlorophosphine ranging from about 3:1 to about 15:1, to form alkylphosphine;
   (c) methylating the alkylphosphine to form a quaternary alkyltrimethylphosphonium salt.

2. The process of claim 1 wherein alkyl ranges from about 7 to about 25 carbon atoms and the catalyst is palladium.

3. The process of claim 2 wherein alkyl is selected from the group consisting of decyl and dodecyl.

4. The process of claim 2 wherein an additional step comprises cleaving the quaternary alkyltrimethylphosphonium salt with a base to form alkyldimethylphosphine oxide.

5. A process for the production of quaternary phosphonium salts, which comprises:
   (a) reacting aluminum trialkyl and phosphorous trichloride, wherein the molar ratio of phosphorous trichloride to aluminum trialkyl ranges from about 3.5:1 to about 20:1 and the temperature ranges from about 70° F. to about 180° F., to form a complex of alkyldichlorophosphine and aluminum chloride;
   (b) separating the alkyldichlorophosphine by:
      (1) distilling the reaction mixture in a vacuum to remove excess phosphorous trichloride; then
      (2) adding a complexing agent which preferentially forms a complex with the aluminum chloride thus freeing the alkyldichlorophosphine; and
      (3) extracting the free alkyldichlorophosphine from the reaction mixture;
   (c) hydrogenating the alkyldichlorophosphine in the presence of a catalyst selected from the group consisting of palladium, copper, nickel, and platinum, at a mole ratio of hydrogen to alkyldichlorophosphine ranging ranging from about 3:1 to about 15:1, to form alkylphosphine;
   (d) methylating the alkylphosphine with a mixture comprising from about 5 to about 2 parts methyl chloride and from about 1 to about 3 parts methanol, to form a quaternary alkyltrimethylphosphonium salt.

6. The process of claim 5 wherein alkyl ranges from about 7 to about 25 carbon atoms and the catalyst is palladium.

7. The process of claim 6 wherein alkyl is selected from the group consisting of decyl and dodecyl.

8. The process of claim 6 wherein an additional step comprises cleaving the quaternary alkyltrimethylphosphonium salt with a base selected from the group consisting of sodium hydroxide, barium hydroxide, calcium hydroxide, and sodium methoxide, to form alkyldimethylphosphine oxide.

9. The process of claim 8 wherein in step (a) the molar ratio of phosphorous trichloride to aluminum alkyl ranges from about 5:1 to about 12:1 and the temperature ranges from about 90° F. to about 150° F.

10. The process of claim 9 wherein in step (b) the complexing agent is selected from the group consisting of phosphorous oxychloride, water, potassium chloride, and bis-dichloromethylether.

11. The process of claim 10 wherein in step (c) the pressure ranges from about 100 p.s.i. to about 2000 p.s.i. and the temperature ranges from about 80° F. to about 500° F.

References Cited

UNITED STATES PATENTS

| | | | |
|---|---|---|---|
| 3,036,132 | 5/1962 | Becker | 260—606.5 |
| 3,389,183 | 6/1968 | Hays | 260—606.5 |

OTHER REFERENCES

Houben-Weyl: Methoden der Organischen Chemie, vol. 1 (1963), p. 55.

TOBIAS E. LEVOW, Primary Examiner

W. F. W. BELLAMY, Assistant Examiner